United States Patent
Koning et al.

(10) Patent No.: US 7,706,274 B2
(45) Date of Patent: Apr. 27, 2010

(54) HIGH PERFORMANCE TCP FOR SYSTEMS WITH INFREQUENT ACK

(75) Inventors: G. Paul Koning, New Boston, NH (US); Kirtley C. Gillum, Hudson, NH (US); Ronald T. Menner, Brookline, NH (US); Andrew C. Ferris, Pepperell, MA (US)

(73) Assignee: Dell Products L.P., Round Rock, TX (US)

( * ) Notice: Subject to any disclaimer, the term of this patent is extended or adjusted under 35 U.S.C. 154(b) by 1186 days.

(21) Appl. No.: 11/194,130

(22) Filed: Jul. 29, 2005

(65) Prior Publication Data

US 2006/0034286 A1 Feb. 16, 2006

Related U.S. Application Data

(60) Provisional application No. 60/592,065, filed on Jul. 29, 2004.

(51) Int. Cl.
*H04L 12/26* (2006.01)

(52) U.S. Cl. .................. 370/235; 370/229; 370/389; 370/394; 370/400; 709/234; 709/235

(58) Field of Classification Search ................. 370/229, 370/235, 389, 394, 400; 709/234, 235
See application file for complete search history.

(56) References Cited

U.S. PATENT DOCUMENTS

| | | | |
|---|---|---|---|
| 5,912,878 A | | 6/1999 | Park et al. |
| 5,974,028 A | * | 10/1999 | Ramakrishnan ............. 370/229 |
| 6,078,564 A | | 6/2000 | Lakshman et al. |
| 6,105,064 A | * | 8/2000 | Davis et al. ................. 709/224 |
| 6,831,912 B1 | * | 12/2004 | Sherman ..................... 370/349 |
| 7,290,195 B2 | * | 10/2007 | Guo et al. ................... 714/749 |
| 7,397,759 B2 | * | 7/2008 | Tan et al. .................... 370/216 |
| 2002/0163888 A1 | * | 11/2002 | Grinfeld ..................... 370/235 |
| 2005/0201284 A1 | * | 9/2005 | Cheriton ..................... 370/232 |

OTHER PUBLICATIONS

Allman, M. 1998. On the generation and use of TCP acknowledgments. SIGCOMM Comput. Commun. Rev. 28, 5 (Oct. 1998), 4-21.*
Allman, M. 1999. TCP byte counting refinements. SIGCOMM Comput. Commun. Rev. 29, 3 (Jul. 1999), 14-22.*
Allman, M. RFC 3465 TCP Congestion Control with Appropriate Byte Counting, Feb. 2003.*
Comer, D. E., "Internetworking with TCP/IP Principles, Protocols, and Architectures," 4(1):220-223 (1995).
International Search Report and the Written Opinion of the International Searching Authority, or the Declaration, International Application No. PCT/US05/27212, dated Mar. 16, 2006, 12 pages.

* cited by examiner

*Primary Examiner*—Dang T Ton
*Assistant Examiner*—Robert M Morlan
(74) *Attorney, Agent, or Firm*—Hamilton, Brook, Smith & Reynolds, P.C.

(57) ABSTRACT

A method for processing data packets in a network communication environment. In response to receiving an acknowledgment (ACK) of a previously sent burst of data packets, the amount of data acknowledged is compared to the amount of data in the burst that was originally sent. If the ACK covers at least a predetermined amount (or more) of the data in the original burst, then a burst size parameter is increased for future communications; however, if the ACK covers less than the predetermined amount of the original burst, then the burst size parameter remains the same.

20 Claims, 6 Drawing Sheets

HIGH PERFORMANCE TCP FOR SYSTEMS WITH INFREQUENT ACK

RELATED APPLICATION(S)

This application claims the benefit of U.S. Provisional Application No. 60/592,065, filed on Jul. 29, 2004. The entire teachings of the above application(s) are incorporated herein by reference.

BACKGROUND OF THE INVENTION

Transmission Communication Protocol (TCP), now quite commonly used in computer network communications, is not a single protocol but actually a family of techniques that are used provide stable and reliable transfer of packet data across an Internet Protocol (IP) connection. The original design of TCP established a stream-based reliable protocol which would work over essentially any type of underlying physical network. The original TCP protocol used a "sliding window", and specified that after packets are sent by a transmitter, acknowledgement packets (ACKs) must be sent from the receiver, before the transmitter is enabled to send new data.

The first widely available version of TCP (4.2 BSD, in 1983) worked reliably in Local Area Networks (LANs). As it was intended initially for implementation on LANs, it was sometimes unable to provide acceptable performance in large, shared (possibly congested) networks such as the Internet. Later implementations of TCP thus evolved to ensure maximum data throughput with minimum loss in widely distributed, shared networks. These later versions of TCP control not only the window size, but also the number of packets sent together in each "burst" or "segment", a packet size, and the timing of packet acknowledgments by the receiver.

For example, the "Tahoe" implementation of TCP introduced significant improvements in congestion control (via a so-called "slow start" algorithm) and congestion avoidance (via multiplicative decrease). Under this algorithm, a TCP transmitter is allowed to transmit a number of bytes determined by the smallest value of the window advertised by the receiver and a congestion window. The congestion window (which is a variable called 'cwnd' in the TCP standard) is initially set to a value of one (1) packet (segment). The value of 'cwnd' is then doubled following successful receipt of each ACK. This results in a normally expected exponential size growth in the value of 'cwnd'.

Tahoe also uses a variable to keep a threshold value of the send window ('ssthresh') which is initialized to the receiver's advertised window size. Following a transmission time out (e.g., when no ACK is received) the algorithm assigns half of the current window size to 'ssthresh' (a multiplicative decrease), 'cwnd' is set to a value of one again, and the slow start phase begins again.

The "Reno" version of TCP introduced a further optimization, called Fast Recovery, to improve performance following retransmission. When duplicate ACKs are received, a Reno TCP transmitter sets 'ssthresh' to one-half of 'cwnd' and retransmits the missing segment. 'Cwnd' is then increased by one segment on reception of each duplicate ACK.

A proposed modification to Reno, called "New Reno", attempts to address two further problems with Reno. Specifically, a smaller value for ssthresh can cause premature termination of the slow start phase and subsequent slow increase in cwnd. A larger value may cause the sender to over-feed packets (i.e., transmit too long of a burst of data packets) causing congestion. New Reno attempts to optimize ssthresh by calculating the byte equivalent of the "bandwidth-delay product" of the network by measuring the arrival time of closely spaced ACKs at the sender.

More information on TCP protocols can be found in various Internet Engineering Task Force (IETF) Request for Comment (RFC) documents such as:

RFC 2001 "TCP Slow Start, Congestion Avoidance, Fast Retransmit and Fast Recovery Algorithms", January 1997; and RFC 2582 "The New Reno Modification to TCP's Fast Recovery Algorithm", April 1999.

These documents are available from the Internet Engineering Task Force (IETF) at their web site at http://www.ietf.org/.

In addition, a description of the threshold optimization schemes used by New Reno can be found in U.S. Pat. No. 6,643,259 issued to Borella, et al.

SUMMARY OF THE INVENTION

The present invention is an improvement to known TCP protocols. In particular, when processing an ACK, the invention compares the amount of data acknowledged with the amount of data in the burst that was originally sent.

If the amount of data acknowledged is the same as the original burst size, then the burst size is increased, similar to the conventional "slow start" algorithm in Tahoe TCP.

However, if the ACK covers an amount of data less than the original burst, then the burst size remains the same similar to the New Reno TCP algorithm.

Also, if there is no additional data waiting to be sent, then the burst size is not changed.

DETAILED DESCRIPTION OF THE INVENTION

A description of a preferred embodiment of the invention follows.

Figure 1:
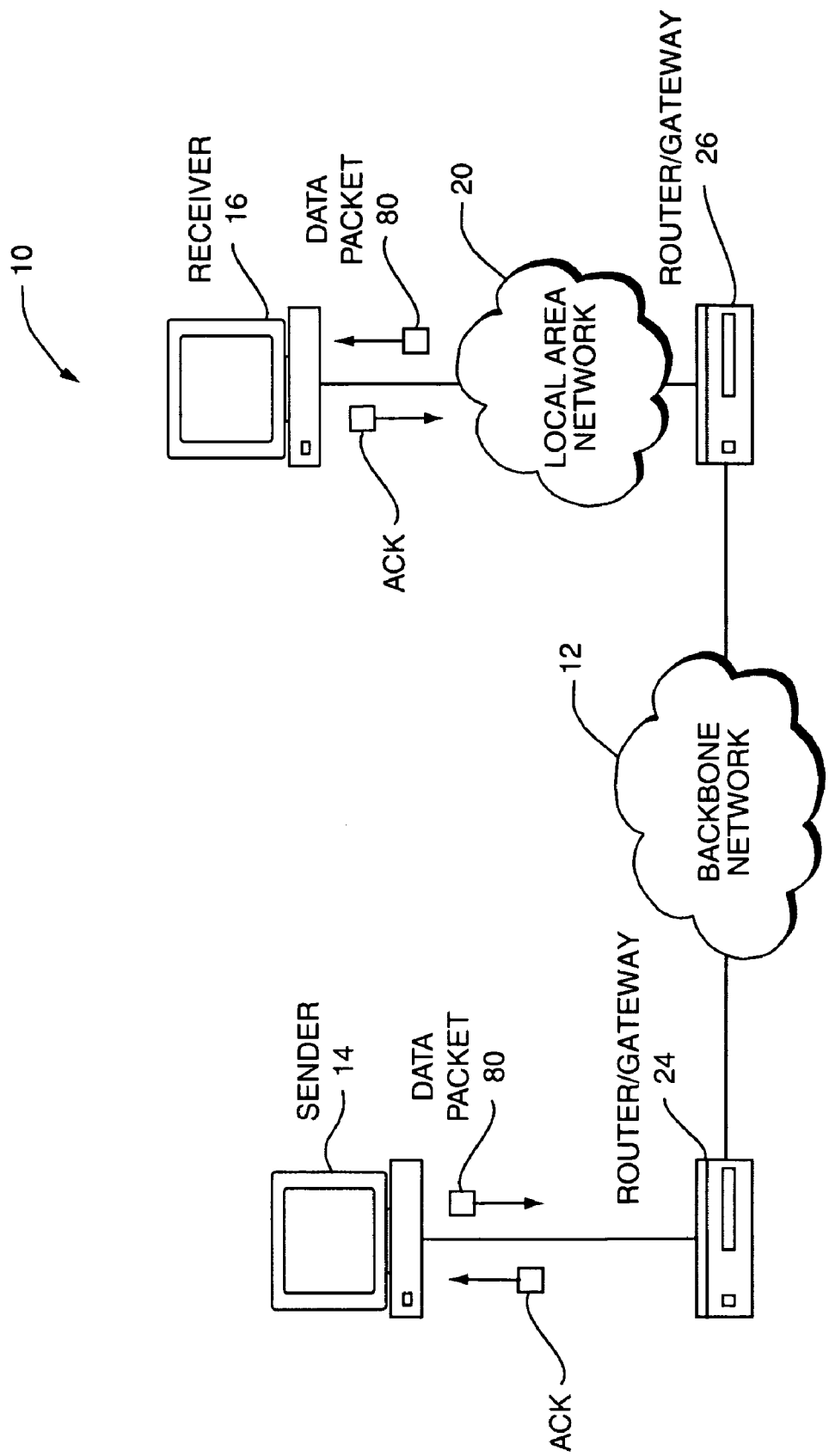
FIG. 1 is a block diagram of a network system in which the invention may be implemented.

FIG. 1 is a block diagram illustrating an exemplary data network 10 for an illustrative embodiment of the present invention. The data network 10 includes a backbone network 12 (e.g. the Internet or a campus network), a first network device 14, and a second network device 16. The backbone network 12 may be shared resource used by many communications systems. Additionally, there may be multiple local area networks ("LANs") 20. Data packets may be transferred to/from the first network device 14 and the second network device 16 over the backbone network 12. For example, the devices may be assigned public network addresses on the Internet. The data channel between the first network device 14 and the second network device 16 may include routers or gateways (24, 26). However, other data network types and network devices can also be used and the present invention is not limited to the data network and network devices described for an illustrative embodiment.

In one preferred embodiment of the present invention, the first 14 and second 16 network devices may include personal computers, telephony devices, bulk data devices, or other network-enabled devices. Bulk data devices can include Web-TV sets and decoders, interactive video-game players, or personal computers running multimedia applications. Telephony devices can include Voice over Internet Protocol ("VoIP") devices (portable or stationary) or personal computers running audio applications. However, the ends of the data flow may include other types of network devices and the present invention is not restricted to personal computers, telephony devices, or bulk data devices.

Network devices and routers for preferred embodiments of the present invention include network devices that can interact with network system 10 based on standards proposed by the Institute of Electrical and Electronic Engineers ("IEEE"), International Telecommunications Union-Telecommunication Standardization Sector ("ITU"), Internet Engineering Task Force ("IETF"), or other protocols. IEEE standards can be found on the World Wide Web at the Universal Resource Locator ("URL") "www.ieee.org." The ITU, (formerly known as the CCITT) standards can be found at the URL "www.itu.ch." IETF standards can be found at the URL "www.ietf.org." It will be appreciated that the configuration and devices of FIG. 1 are for illustrative purposes only and the present invention is not restricted to specific protocols or types of network devices.

Moreover, the configuration of data network 10 is not restricted to one backbone network 12 and one LAN 20 as shown in FIG. 1. Many different configurations of the data network 10 with multiple data networks and/or multiple local area networks at various positions in the data network configuration 10 are possible.

An operating environment for network devices (14, 16) of the present invention typically include a Network Interface Controller ("NIC") having at least one programmable data processor or signal processor, that we will refer to as a Central Processing Unit ("CPU") herein. In accordance with the practices of persons skilled in the art of computer programming, the present invention is described below with reference to acts and symbolic representations of operations or instructions that are performed by the CPU, unless indicated otherwise. Such acts and operations or instructions are referred to as being "computer-executed".

It will be appreciated that acts and symbolically represented operations or instructions include the manipulation of electrical signals by the CPU. An electrical signals typically represent data bits, and the data bits may be further stored or read from memory locations in a memory system associated with the CPU to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) storage system readable by the CPU. The computer readable medium includes cooperating or interconnected computer readable medium, which exist exclusively on the processing system or be distributed among multiple interconnected processing systems that may be local or remote to the processing system.

Network Device Protocol Stack

Figure 2:
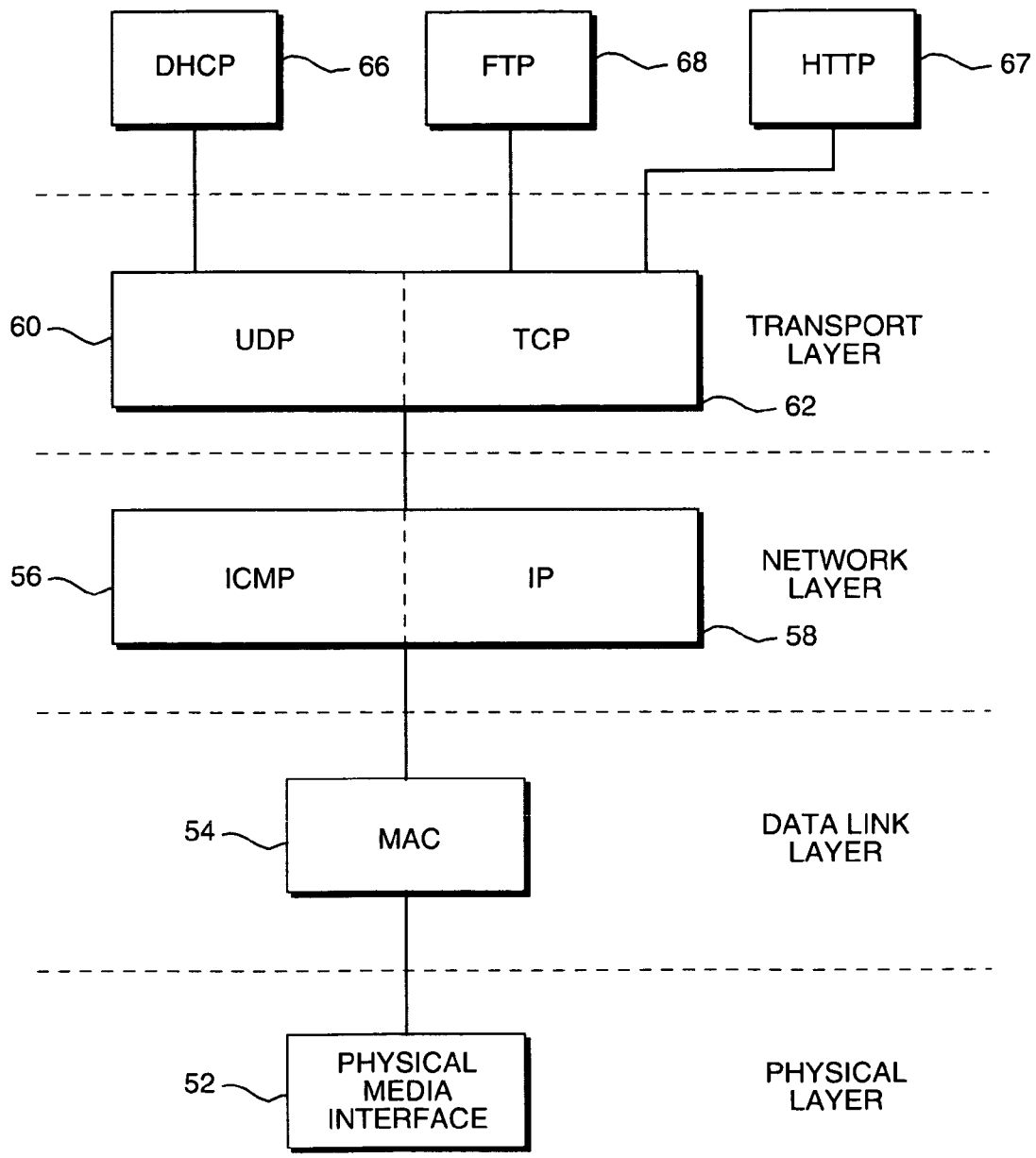
FIG. 2 is a diagram illustrating a protocol stack.

FIG. 2 is a block diagram illustrating a protocol stack 50 for network devices in data network 10. As is well known in the art, the Open System Interconnection ("OSI") model is used to describe computer networks. The OSI model consists of seven layers including (from lowest-to-highest), a physical, data-link, network, transport, session, presentation, and application layer. The physical layer transmits bits over a communication link. The data link layer transmits error free frames of data. The network layer transmits and routes data packets.

The lowest layer of the protocol stack is the physical layer. The physical layer includes the physical media interfaces 52 that place signals on transmission media such as wires, coaxial cable, optical fiber, or transmit them as electromagnetic waves. The physical media interfaces 52 also read signals from the transmission media and present them to the data-link layer.

In the data-link layer is a Medium Access Control ("MAC") layer 54. As is known in the art, the MAC layer 54 controls access to a transmission medium via the physical layer. Common MAC layer protocols 54 include IEEE 802.3 for Ethernet and IEEE 802.14 for cable modems. However, other MAC layer protocols 54 could also be used and the present invention is not limited thereby.

Above the data-link layer is an Internet Protocol ("IP") layer 58. The IP layer 58, roughly corresponds to the network layer in the OSI model, but is typically not defined as part of the OSI model. As is known in the art, IP 58 is a message addressing and delivery protocol designed to route traffic within a network or between networks.

The Internet Control Message Protocol ("ICMP") layer 56 is used for network management. The main functions of ICMP 56 include error reporting, reachability testing (e.g., "pinging") congestion control, route-change notification, performance, subnet addressing and others. Since the IP 58 is an unacknowledged protocol, datagrams may be discarded and the ICMP 56 is used for error reporting. For more information on the ICMP 56 see RFC-792 incorporated herein by reference.

Above IP 58 and ICMP 56 is a transport layer which may be a User Datagram Protocol layer 60 ("UDP") or Transmission Control Protocol ("TCP") layer 62. As is known in the art, UDP 60 provides a connectionless mode of communications with datagrams.

Of particular interest to the preferred embodiment of the present invention is a transport layer that includes a connection-oriented Transmission Control Protocol ("TCP") layer 62. For more information on TCP see RFC-793 and RFC-1323 incorporated herein by reference. The operation of the invention within the context of TCP 62 layer is discussed in more detail below.

Above the transport layer is an application layer where the application programs that carry out desired functionality for a network device reside. For example, the application programs for the network device 16 may include printer application programs, while application programs for the network device 14 may include facsimile application programs. The application layer typically includes a Dynamic Host Configuration Protocol ("DHCP") layer 66 and/or a File Transfer Protocol ("FTP") layer 68, or other applications such as Hypertext Transfer Protocol ("HTTP") 67. The specific application layers in use with the preferred embodiment of the invention are not important. It should also be understood that more or fewer protocol layers can also be used in the protocol stack 50.

Packet Format

Figure 3:
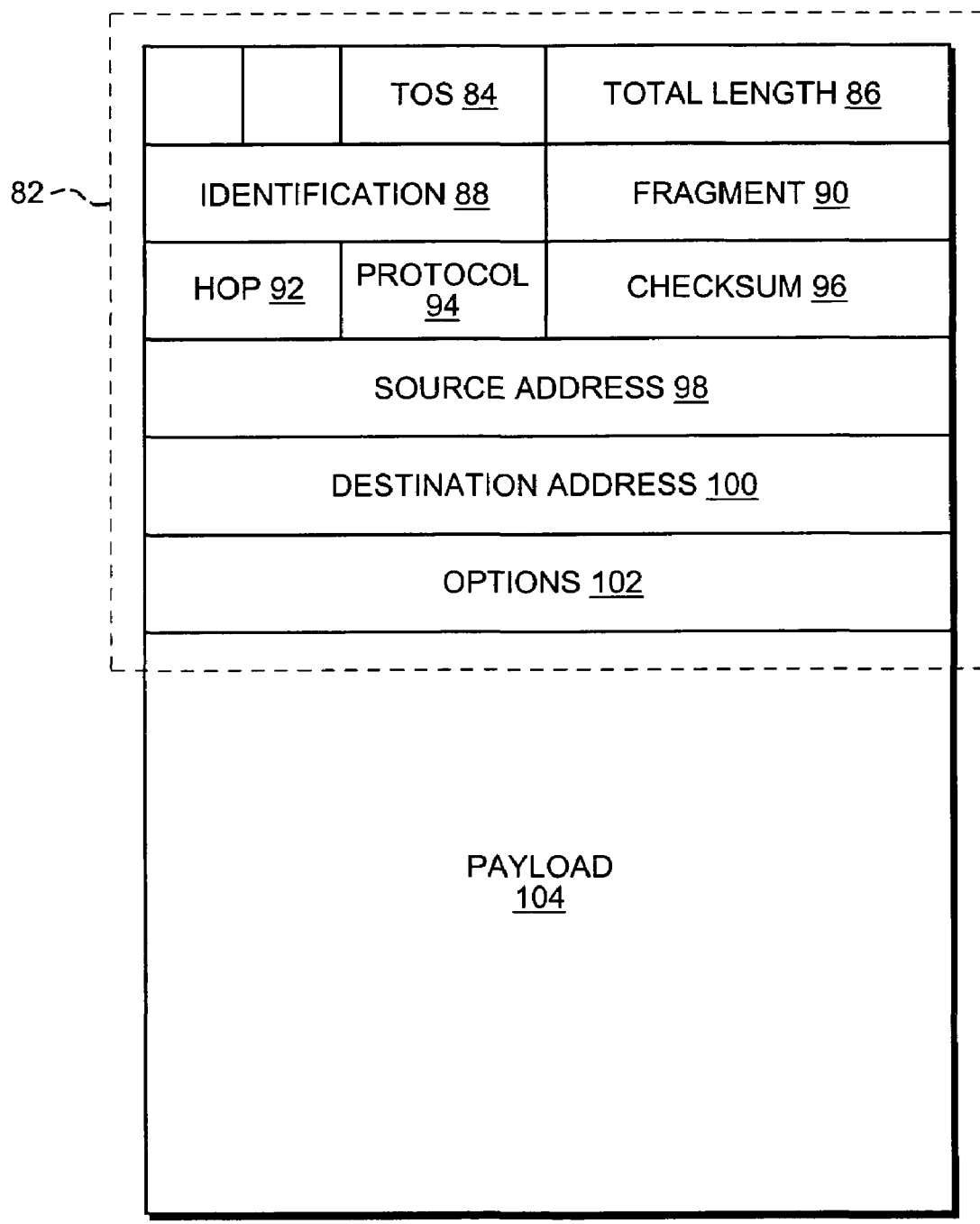
FIG. 3 illustrates the structure of a TCP/IP packet.

The IP 58 layer transmits and routes data in the form of IP packets. FIG. 3 is a block diagram illustrating the structure of one such packet 80. The packet 80 includes a header field 82 and a payload field 104. The payload field 104 of the packet 80 typically comprises the data that is sent from one network device to another. However, the payload field 104 may also comprise network management messages, such as ICMP 56 messages, or data packets of another protocol such as UDP 60, TCP 62, FTP 68, or DHCP 66.

The header field 82 includes a type of service ("TOS") field 84, a total length field 86, an identification field 88, a fragment field 90, a number of hops ("HOP") field 92, a protocol field 94, and a header checksum field 96. For more information on the structure of an IP58 packet 80 see RFC-791 incorporated herein by reference. The source address field 98 may contain the IP 58 address of the network device that transmitted the IP 58 packet 80 onto the data network 10. The destination address field 100 may contain the IP 58 address of the network device that is the intended recipient of the IP 58 packet 80 on the data network 10. The IP 58 header field 82 may also include an options field 102 and other fields known to those skilled in the art.

TCP Behavior

As is well known in the art, one use of TCP 62 is to guarantee the sequential delivery of data packets 80 from a sender to a receiver. We will refer to the first network device 14 as the sender and the second network device 16 as the receiver; although it should be understood that any network device can be a sender or receiver. If packets are lost or arrive corrupted, TCP assures that such packets are retransmitted. Furthermore, TCP 62 attempts to monitor congestion on a data network 10 and it adjusts its transmission rate accordingly. Flow control processes are chosen in an attempt to allocate bandwidth fairly when streams of data are competing for limited network resources. TCP 62 implements its flow control by using sliding "windows." The sliding windows allow a sender 14 hosting a source application to transmit multiple packets to a receiver 16 hosting the destination application without having to wait for an acknowledgement. Flow control driven by the receiver 16 is referred to as 'flow control' whereas flow control driven by the sender 14 is referred to as 'congestion control.'

A TCP 62 connection between a sender 14 and receiver 16 is established by a three way handshake, also well known to those skilled in the art. During the setup of a connection, the TCP 62 process on the receiver 16 has the option of sending a maximum segment size ("MSS") value to the TCP 62 process on the sender 14. This is done to prevent fragmentation of packets on links that lead to the receiving network device. The default value used is typically 536 bytes although other values may be used. Typically, if a larger maximum segment size is acceptable by the data network 10 it will result in a greater maximum throughput.

During the exchange of data packets and acknowledgement packets ("ACKs"), flow control is effected by the receiver which advertises to the sender an offered window ('awnd'). 'Awnd' represents how much data the receiver 16 can currently accept without overflowing its buffer. The receiver's 16 usable window is defined as the amount of data that can be currently sent given the offered window and the outstanding unacknowledged packets. Different implementations of TCP 62 have different default offered windows. Typical values are 2048 byte send and receive buffers or 4096 byte send and receive buffers.

Congestion control is more complicated. A TCP 62 sender 14 has a very limited number of methods to perceive network congestion. Three indications of congestion are perceived packet loss, fluctuating round trip delays, and duplicate acknowledgements (ACKs). Given the limited amount of information and the delay in receiving feedback from the data network 10, it is difficult for TCP 62 to adapt quickly to the network conditions.

TCP 62 typically uses packet loss to infer that congestion has occurred in the network. Errors on the physical links of typical modem data networks occur relatively rarely due to improvements in long-haul physical media such as fiber-optic cable. Wireless links, however, are still prone to error. As the physical loss rate is typically very small, much less than one percent, any data packet that is not acknowledged is considered a loss due to congestion. Data packets that are deemed to contain errors when received by the receiver 16 are discarded at the receiver 16 and do not get acknowledged. When network congestion is recognized by the sender 14, by the absence of acknowledgement packets, the TCP 62 process on the first network device 14 limits the rate at which it injects packets into the network. To perform this task, the TCP 62 process on the sender 14 alters the value of a congestion window ('cwnd'). The congestion window 'cwnd' is the maximum number of outstanding bytes allowed in the data network 10.

In the typically implementation of TCP, the value of 'cwnd' is decreased in the presence of congestion and increased when congestion is not detected. This behavior allows for constant feedback to changing conditions on the data network 10 without swamping the data network 10 with traffic.

The TCP 62 process on the sender 14 also maintains a running estimate of roundtrip delay time ("RTT") and delay variance ("A") to determine whether packet loss has occurred. Thus, after transmitting a data packet, if the sender 14 does not receive an acknowledgement packet ("ACK") from the receiver 16 within a time specified by these parameters, then a packet loss is assumed, and the data packet is retransmitted.

TCP Reno

Figure 4:
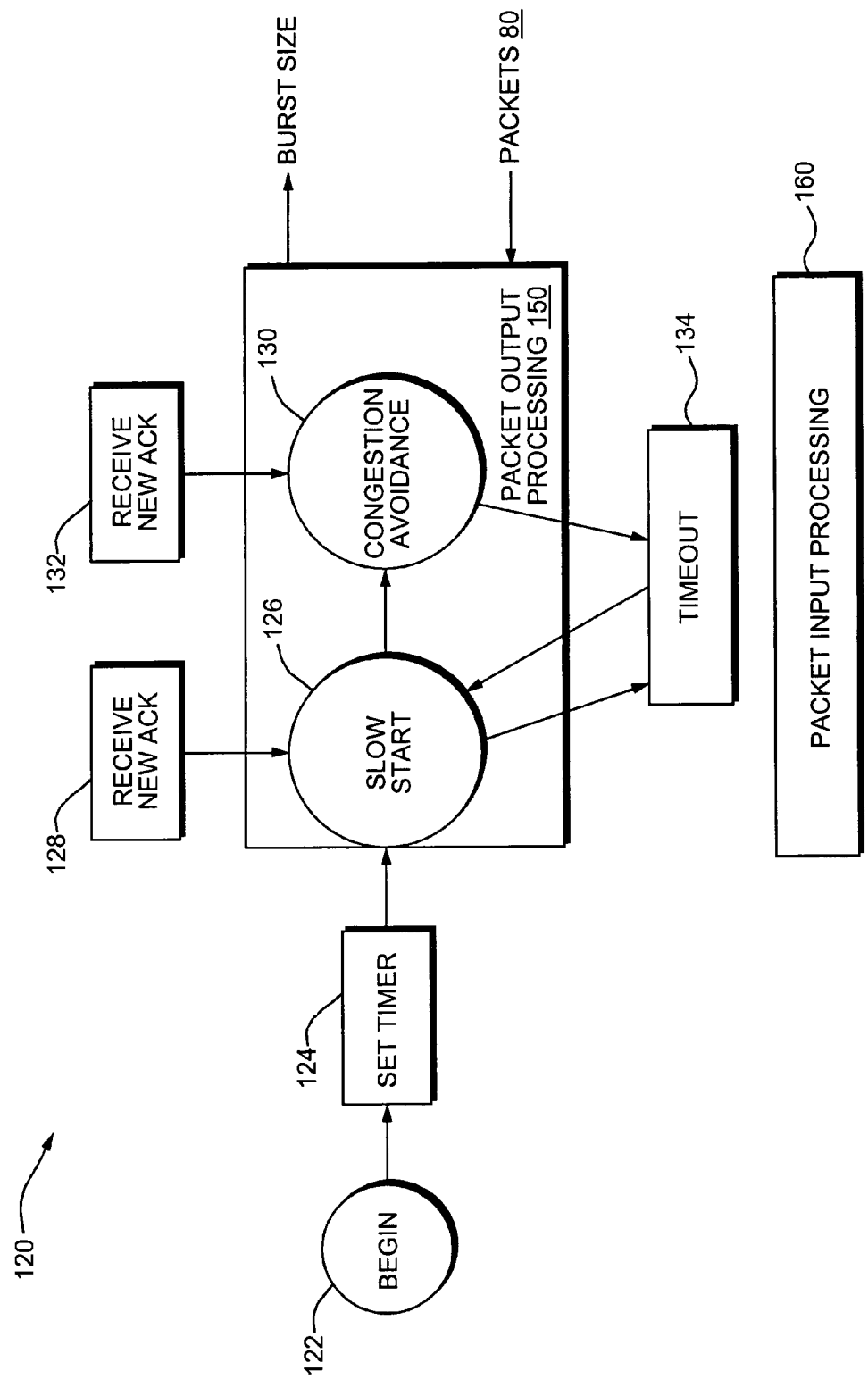
FIG. 4 is a high level diagram of process that implements TCP according to the invention.

We begin here with a discussion of typical standard TCP flow control, according to the so-called "Reno" implementation of TCP, prior to discussion of the improvement provided by the present invention. FIG. 4 is a block diagram illustrating a Transmission Control Protocol 62. After connection setup, the TCP 62 process on the sender 14 is in the beginning state 122. In the beginning state 122, the congestion window is set to an initial window value ("IW"). Typically, IW is the same as MSS, although certain implementations of TCP will set IW to 2 or 4 times MSS. In particular, when communicating with a receiver 16 that uses delayed ACKs, an IW greater than MSS will eliminate unnecessary delay for the first packet. Additionally, transaction-oriented connections, such as electronic mail or hypertext markup connections, typically transmit a small amount of data per connection. A sufficiently large IW may be able to transmit all of this data in one window, greatly increasing transaction speed.

Additionally, in the beginning state 122, a threshold value is set for a transition from a slow start phase 126 to a congestion avoidance phase 130 within a packet output processing module 150. The value of this threshold 'ssthresh' is set to the offered window 'awnd' from the second network device 16.

Once the parameters of the TCP 62 process have been initialized in the beginning state 122, the sender 14 transmits the initial window of data and sets the return trip timer.

The TCP 62 process then enters the slow start phase 126 of packet processing 150. The slow start phase 126 is one of the congestion control components of TCP 62. Combined with the congestion avoidance phase 130, it provides a tentative probing of end-to-end network bandwidth by increasing 'cwnd' only when the sender 14 receives a new ACK 128. During slow start 126, the congestion control window size is increased on every new ACK reception 128. The rate at which packets are introduced into the data network 10 are thus gated according to the rate that ACKs are returned to the sender 14. This maintains conservation of flow between the sender 14 and the receiver 16.

When slow start 126 is entered, 'cwnd' has already been set to IW at the beginning state 122. However, with each new ACK received 128 from the receiver 16, the sender 14 increases 'cwnd' by MSS and resets the return trip timer. The number of transmitted segments thus effectively doubles with each successfully acknowledged cwnd, which is approximately every round trip time RTT. The slow start process 126 continues to receive new ACKs 128 and increase 'cwnd' until either the offered window 'awnd', defined by the receiver 16, is reached or the threshold 'ssthresh' is reached, signifying the transition into the congestion avoidance phase 130.

However, if the sender 14 does not receive an ACK, for any packet within time RTT+4A, it times out 134 and assumes that the oldest unacknowledged packet and all more recently transmitted packets were lost. This is usually an indication of a significant congestion event. At timeout 134, the oldest unacknowledged packet is retransmitted, the slow start threshold 'ssthresh' is effectively set to half the value of 'cwnd' before timeout, 'cwnd' is set to MSS, the return trip timer is reset, and the TCP 62 process reenters the slow start phase 126.

The congestion avoidance phase 130 is a component of the TCP 62 congestion control that also prohibits overuse of capacity. The congestion avoidance phase 130 is entered when the congestion window crosses the slow start threshold, e.g., 'cwnd'>='ssthresh'. Congestion avoidance 130 is entered when some form of congestion has been detected or the sender 14 is likely to be approaching the maximum rate at which the receiver 16 can process data. The goal of this state is to very slowly increase 'cwnd' so that the sender 14 does not try to transmit more than the bandwidth available in the data network 10. The process for increasing cwnd differs in that 'cwnd' grows linearly for every ACK received 132 from the receiver 16. Again, if a data packet is not acknowledged within time RTT+4A, the TCP 62 process times out 134 as described above and enters the slow start phase 126.

Thus, consider the time dependence of data throughput from the sender 14 to the receiver 16 for a TCP 62 process. The TCP 62 process starts in the beginning state 122 and enters the slow start phase 126. If the slow start phase 126 does not time out, the TCP 62 process enters the congestion avoidance phase 130 when the congestion window 'cwnd' crosses the slow start threshold 'ssthresh'. The congestion window and throughput increase linearly with time in the congestion avoidance phase 130 until the data network 10 is unable to support the packet insertion rate of the sender 14. Packets are then lost and not acknowledged and a timeout occurs 134. At timeout 134, the slow start threshold 'ssthresh' is reset to half the last congestion window 'cwnd' and the TCP 62 process reenters the slow start phase 126. When the congestion window 'cwnd' crosses the new slow start threshold 'ssthresh', the TCP 62 process again enters the congestion avoidance phase 130.

TCP New Reno

In addition to the states of FIG. 4 already discussed, the TCP 62 process may also allow for a fast retransmission and a fast recovery. This is a special case, when duplicate ACKs are received by the sender 14. Both processes may prove TCP 62 performance under conditions of light or transient congestion. Fast retransmission, for example, is an action that TCP 62 will take when it receives a third duplicate ACK. This circumstance indicates that at least one packet out of a flight may have been lost, but at least three subsequent packets have arrived successfully.

Rather than reduce 'cwnd' to MSS and enter slow start 126, the New Reno version of TCP 62 immediately retransmits the packet it assumes to be lost (the last unACKed packet), decreases 'ssthresh' to half of 'cwnd', and sets 'cwnd' to be 'ssthresh'+3 MSS. These adjustments reflect that since three packets after the "lost" packet were received, the sender may be able to transmit three more packets. A fast recovery state is entered after fast retransmission is performed.

Fast recovery waits for the last unACKed packet to be ACKed but allows the sender 14 to transmit new packets if subsequently transmitted packets are ACKed. In fast recovery, TCP 62 assumes either that packets have been re-ordered by the network or that congestion is light or transient. When a duplicate ACK is received, it is assumed that congestion is not significant, and so 'cwnd' is increased by MSS, allowing the sender to transmit another packet because a packet from the flight has been received by receiver 16. When a new ACK is received, it indicates that all of the packets from the flight of the "lost" packet have been received. 'Cwnd' is then set to 'ssthresh' and congestion avoidance 130 is entered. If the TCP 62 sender times out 134 while in fast recovery, slow start 126 is entered.

Setting Burst Size According to the Amount of Data Covered by an ACK

In a conventional New Reno implementation of TCP 62, the sender 14 may send packets in relatively small 'bursts', For example, a sender 14 may send bursts containing only four (4) packets. The typical New Reno TCP receiver 16 will send an ACK for every second packet that it receives. The typical sender's 14 rule is that for every ACK it receives, it sends a new (4 packet) burst, subject to the TCP send window.

The result is that the number of packets "in flight" between the sender 14 and receiver 16 typically increases. This is desired, in order to maximize network throughput. However, this will be true only if the receiver 16 implements the TCP convention of sending an ACK immediately after receiving two (2) packets. While this is convention in the original TCP protocol, it is unfortunately not a requirement of the TCP protocol standards, either Reno or New Reno. Therefore, this cannot be guaranteed to occur.

Indeed, some TCP implementations, such as the one used by the Microsoft Windows 2000 ("Win2k") Operating System, have been observed to use different ACK rules. In particular, a Win2k sender 14 will send an ACK for each entire group of received bursts, and this may occur with some delay after the receipt of the initial packet. Since each ACK will trigger the transmission of another burst (again 4 packets) by sender 14, the number of packets "in flight" in a Win2k implementation will, in this situation, never increase beyond the initial 4 packet burst size. The throughput obtained is therefore quite unacceptable.

When the receiver 16 implements the convention of sending an ACK every second packet, the standard schemes work well. However, an ACK for every second packet is not always required, such as in the Reno or New Reno versions of TCP. Thus, some receivers send ACKs less frequently than every second packet. If so, a short burst may trigger only a single acknowledgement, and that only after the standard TCP ACK delay.

The aim of the invention is to increase the burst size in that case, rather than to continue using the initial window size as the standard algorithms would. This allows the transmitter and receiver to communicate at high speed even when the receiver implements infrequent acknowledgment.

The present invention thus provides for a modification to a standard TCP implementation. The invention allows a TCP sender 14 to achieve high performance even with receivers 16 do not ACK every second packet.

Figure 5:
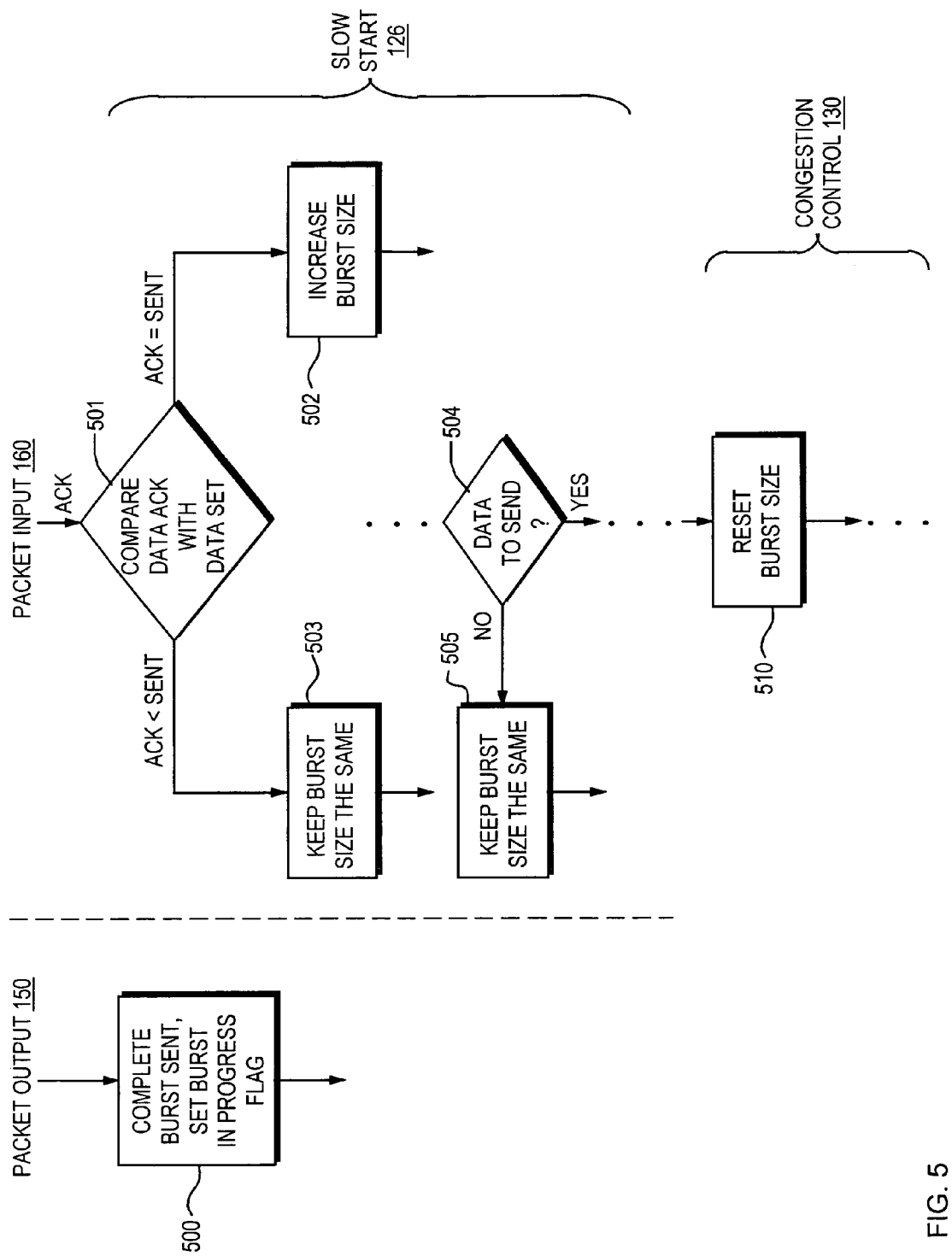
FIG. 5 is a more detailed flow chart of the steps performed.

FIG. 5 is a flow chart illustrating the steps performed by the invention. Step 500 is performed by output processing block 150. Once a complete burst is sent out, a burst in progress flag is set to indicate to the input processing 160 that the following steps are to be performed.

Note that packet output processing 150 need only send another packet if there is (a) no burst in progress, or (b) room in the current burst to send. There will typically only be one tracked burst outstanding at any one time; note also that this does not restrict the total number of packets in flight.

A next step 501 is performed when the input process 160 receives an ACK. This step compares the amount of data acknowledged with the amount of data that was originally sent in the burst. Thus, the process needs to keep track of the amount of data originally sent in each burst, and then match up each received ACKs to the corresponding packets in each burst. Such information may be kept in a status table, as will be described in greater detail below.

In step 502, if the ACK covers the entire original burst, then the burst size is increased in an amount according to the increase for the window size parameter 'cwnd' specified in a conventional "slow start" algorithm such as Tahoe. For example, at this point the process might increase the burst size by an amount MSS. TCP processing then continues as normal.

In step 503, however, if the ACK covers a number of packets that is less than the total number of packets in the original burst, then the burst size is left alone. This step thus operates more like the conventional New Reno algorithm. Again, the TCP processing will continue from this point as in the prior art.

At some point a step 504 may be reached. Here, an additional test is made to see if there is any additional data queued to be sent. If there is no additional data waiting to be sent, then the burst size is left alone in this state.

In a further refinement, the invention can be sensitive to the size of the packets in the bursts. As one example, Ethernet now commonly uses "jumbo" frames of 9018 bytes. In this environment, the burst size increase process may cause congestion in such networks with large packets. In that case, the invention may only be applied where packet size is set to be smaller, such as 4096 bytes or less.

An area for further refinement with the invention is to control the burst size also in congestion processing 130. In one preferred embodiment of the invention, a step 510 is thus carried out within congestion processing 130, where the burst size value is reset to its initial value on a congestion event. This is similar to the what classic slow start rule in Tahoe does to 'cwnd'. However, other implementations may reduce but not completely reset the burst size, similar to the so-called Flower/Ramakrishnan congestion rule used in DECnet systems.

It should also be understood that the invention is more general than has been described above. For example, it encompasses other threshold ACK amounts in step 502. What was assumed in the discussion above for step 502 was that a conventional ACK procedure was being used, where an ACK is provided by the receiver 16 for every two packets. However, a variant of the invention would choose a threshold amount of packets per ACK. The threshold could be more than two packets but at most equal to the burst size. The threshold would operate such that an ACK of the threshold amount (or more) causes an increase in the burst size. This variant allows for faster increase in burst size—essentially it allows an increase in burst size at the same rate as if the receiver 16 had not been using the "ACK two packets" rule at all.

As alluded to above, an implementation of the invention may be implemented by adding several data structures to the TCP layer 62 and modifying certain other functionality.

Figure 6:
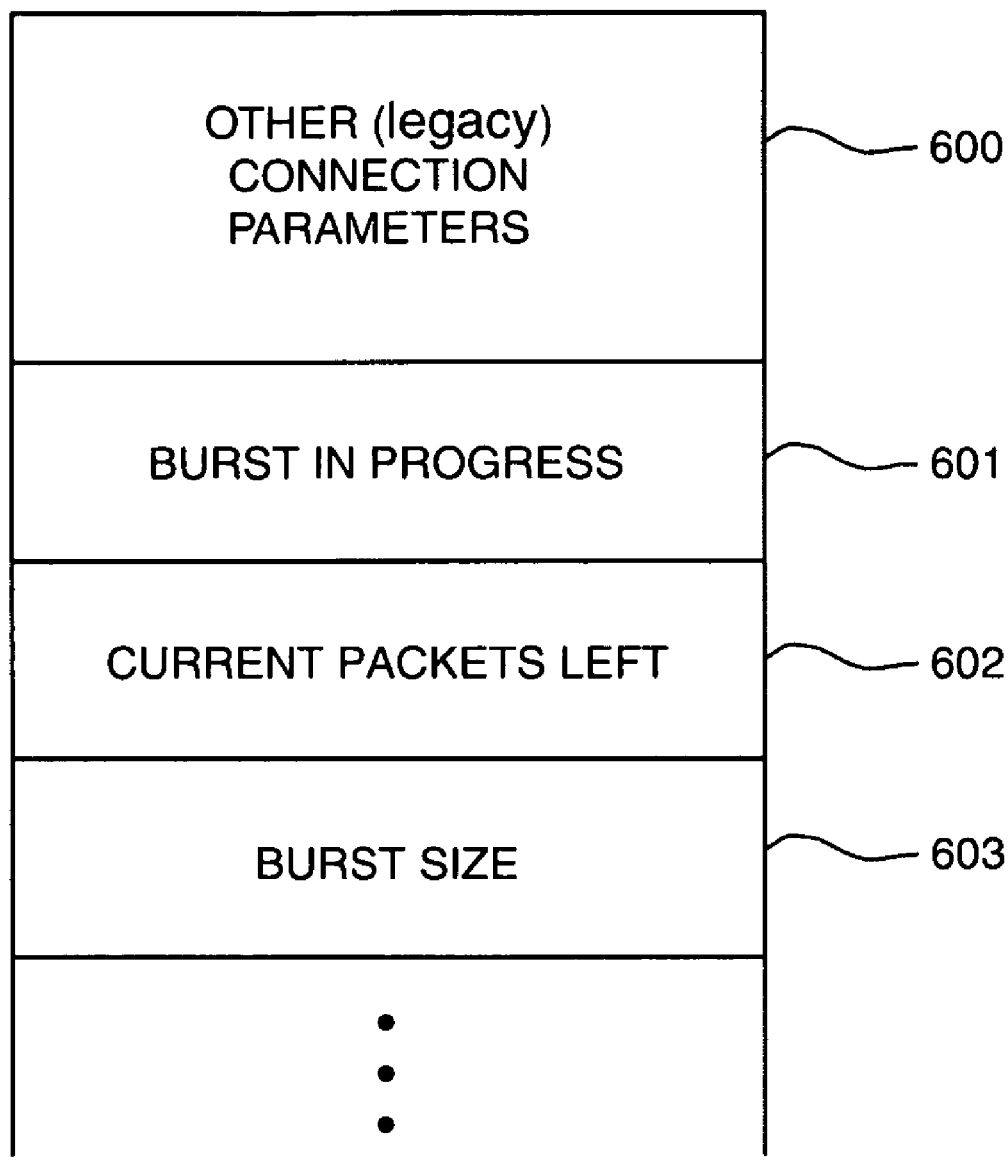
FIG. 6 illustrates a per-connection data structure.

First, it is necessary for the TCP layer of a sender to track and maintain the burst size (per New Reno) on a per-connection basis. This requires at least the following parameters to be maintained in context for each connection. These parameters may be stored in a connection statistics block 600 associated with each connection. One such parameter block is depicted in FIG. 6:

burst in progress flag 601 (should be true most of the time for a busy connection);

current packets left 602 in Reno burst; and burst size 603 (quantified by min==current_default, max==current_default*N, where N may be 8).

The current Reno burst size 603 should be stored so that burst settings can be confirmed for different connections. In a preferred embodiment, these parameters would be stored at the end of a connection statistics block 600 to be backwards compatible with older TCP layer 62 implementations.

In addition, as packet processing watches Reno ACKs, it can implement further control over the burst size. In particular, if the amount of data acknowledged is greater than or equal to at least one-half ($\frac{1}{2}$) the entire outstanding burst size, and there is more data to send, then the connection's burst size 603 parameter can be increased by a graduated amount (such as according to the slow start rules for standard Reno). Packet processing 150 then proceeds as usual, and sends another burst as normally required upon reception of an ACK (up to the available window size 'cwnd').

When the send window fills, the current packets left field 602 can also be reset to 0, and the burst in progress flag 601 is set to false.

Slow start recovery 126 may also need to reset the burst size to the default value or graduate the burst size down per standard timeout rules (e.g., as specified by Reno). Similarly, a connection that enters an idle state will also reset the burst size to the default value.

There are several benefits to the invention.

Avoids the New Reno "stall". Under certain conditions the standard New Reno TCP algorithm may allow no increase in burst size at all (such as in the Win2k example). The invention avoids this situation and ensures that burst size will increase regardless of the number of ACKs sent.

Higher throughput for peers that have fixed ACK holdoff timers (like Windows 2000). It is known that that a burst size of 32 works well with Windows 2000 for large transfer sizes. Small transfer sizes will see less packet loss. Since the system will no longer be sending a burst for every call to the TCP send packet routine, the process will respond to peer processes' ability to consume small packets. In theory, this could be a very positive throughput enhancement (as with the prior art, it is possible to readily overrun peer connections).

Less packet loss at high queue depth. All transfer sizes can call the TCP send process 150 whenever they're ready to go out. If there is a burst in progress, and a request to send more data is made, then additional data is sent immediately, provided that the window allows it to be sent at this time. The output to the peer will, thus, largely be controlled by acknowledgments. Again, the process becomes more responsive to the consumption rate of the peer. This can result in a higher rate of lossless data transmission.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for processing data packets in a data communication device comprising:

(a) maintaining a congestion window parameter, the congestion window parameter determining a maximum number of data packets that are allowed to be outstanding between the data communication device and another data communication device;
(b) maintaining a burst size parameter, the burst size parameter determining a maximum number of data packets to be sent together in a burst from the data communication device;
(c) sending an original burst of data packets, with an amount of data in the original burst of data determined by the burst size parameter;
(d) in response to receiving an acknowledgment (ACK) of the original burst of data packets, wherein ACKs are received less frequently than once every second packet in the burst of data;
(e) if the number of packets indicated by the ACK is equal to a number of packets in the original burst of data packets, increasing the congestion window parameter;
(f) if the number of packets indicated by the ACK is less than a number of packets in the original burst of data packets, decreasing the congestion window parameter;
(g) increasing the burst size parameter if the ACK acknowledges at least a predetermined amount of data in the original burst of data, wherein the predetermined amount of data may be less than a number of packets in the original burst of data;
(h) maintaining the burst size parameter to be the same if the ACK acknowledges less than the predetermined amount of data in the original burst of data; and
additionally comprising the step of, wherein, if the amount of data acknowledged by the ACK is greater than one-half the congestion window parameter, and if there are more data packets queued to be sent, then increasing the burst size by a predetermined amount.

2. The method as in claim 1 additionally comprising the step of, after step (d), increasing the burst size parameter if the ACK acknowledges an amount of data equal to or greater than the original burst of data.

3. The method as in claim 1 additionally comprising the step of, when there is no additional data to be sent, maintaining the burst size parameter to be the same.

4. The method as in claim 1 wherein the data packets are TCP packets.

5. The method as in claim 1 additionally comprising the step of, when the data communication device is idle, resetting the burst size parameter to a default value.

6. The method as in claim 1 additionally comprising the step of, when data packet loss is detected, resetting the burst size parameter to a default value.

7. The method as in claim 1 further comprising the step of:
(i) maintaining a burst in progress flag, the burst in progress flag being set to a true state after step (c) of sending the original burst of data packets is complete.

8. The method as in claim 7 wherein steps (g) and (h) are performed only when the burst in progress flag is set to the true state.

9. The method as in claim 8 wherein step (i) further comprises: setting the burst in progress flag is set to the true state only when packets in the original burst have a packet length less than a predetermined packet size limit.

10. The method as in claim 7 wherein the burst in progress flag is set to a false state when the burst size parameter has reached a predetermined maximum burst size.

11. A data communication device comprising:
memory to store a congestion window parameter, the congestion window parameter indicating a maximum number of data packets allowed to be outstanding between the data communication device and another data communication device, and also to store a burst size parameter, the burst size parameter determining a maximum number of data packets to be sent together in a burst from the data communication device;
a transmitter to send an original burst of data, with an amount of data in the original burst of data determined by the burst size parameter;
a receiver to receive an acknowledgment (ACK) of the original burst of data, wherein the receiver receives ACKs less frequently than once every second packet in the burst of data;
a processor to compare an amount of data for which the ACK acknowledges with an amount of data in the original burst of data; and in response thereto,
increase the congestion window parameter if the number of packets indicated by the ACK is equal to a number of packets in the original burst of data packets;
decrease the congestion window parameter if the number of packets indicated by the ACK is less than the number of packets in the original burst of data packets;
increase the burst size parameter if the ACK acknowledges at least a predetermined amount of data in the original burst of data;
maintain the burst size parameter to be the same if the ACK acknowledges less than the predetermined amount of data in the original burst of data; and
increase the burst size by a predetermined amount if the amount of data acknowledged by the ACK is greater than one-half the congestion window size and if there are more data queued to be sent.

12. The data communication device as in claim 11 wherein the processor is further to increase the burst size parameter if the ACK acknowledges an amount of data equal to or greater than the original burst of data.

13. The data communication device as in claim 11 wherein the processor is further to, if there is no additional data to be sent, maintain the burst size parameter to be the same.

14. The data communication device as in claim 11 wherein the data packets are TCP packets.

15. The data communication device as in claim 11 wherein the processor is further to reset the burst size parameter to a default value when the data communication device is idle.

16. The data communication device as in claim 11 wherein the processor is further to reset the burst size parameter to a default value when data packet loss is detected.

17. The data communication device as in claim 11 wherein the memory is further to store a burst in progress flag, and the burst in progress flag set to a true state after the transmitter sends the original burst of data.

18. The data communication device as in claim 17 wherein the processor is further to compare the amount of data for which the ACK acknowledges with the amount of data in the original burst of data and increase only when the burst in progress flag is set to the true state.

19. The data communication device as in claim 18 wherein the burst in progress flag is set to the true state only when packets in the burst have a length less than a predetermined packet size limit.

20. The data communication device as in claim 17 wherein the burst in progress flag is set to a false state when the burst size parameter has reached a predetermined maximum burst size.

* * * * *